US012795578B2

(12) United States Patent
Song et al.

(10) Patent No.: US 12,795,578 B2
(45) Date of Patent: Nov. 10, 2026

(54) DEVICE AND METHOD FOR CONTROLLING E2 NODE IN WIRELESS COMMUNICATION SYSTEM

(71) Applicant: Samsung Electronics Co., Ltd., Suwon-si (KR)

(72) Inventors: Junhyuk Song, Suwon-si (KR); Sunheui Ryoo, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 18/301,688

(22) Filed: Apr. 17, 2023

(65) Prior Publication Data

US 2023/0262638 A1 Aug. 17, 2023

Related U.S. Application Data

(63) Continuation of application No. PCT/KR2021/016576, filed on Nov. 12, 2021.

(30) Foreign Application Priority Data

Nov. 12, 2020 (KR) ........................ 10-2020-0151402
Dec. 7, 2020 (KR) ........................ 10-2020-0169973

(51) Int. Cl.
*H04W 60/00* (2009.01)
*H04W 88/08* (2009.01)

(52) U.S. Cl.
CPC ............ *H04W 60/00* (2013.01); *H04W 88/08* (2013.01)

(58) Field of Classification Search
CPC .............................. H04W 60/00; H04W 88/08
See application file for complete search history.

(56) References Cited

U.S. PATENT DOCUMENTS 10,045,245 B2 8/2018 Heo et al.
11,109,364 B2 8/2021 Yi et al.
(Continued)

FOREIGN PATENT DOCUMENTS

CN 111242304 A 6/2020
CN 111510959 A 8/2020
(Continued)

OTHER PUBLICATIONS

O-RAN: Towards an Open and Smart RAN, 3GPP Draft; S3-193932, 3rd Generation Partnership Project (3GPP), Mobile Competence Centre ; 650, Route Des Lucioles ; F-06921 Sophia-Antipolis Cedex; France; XP051816312; pp. 10-14, Nov. 7, 2019.
(Continued)

*Primary Examiner* — Wayne H Cai
(74) *Attorney, Agent, or Firm* — Jefferson IP Law, LLP

(57) ABSTRACT

The disclosure relates to a 5th generation (5G) or pre-5G communication system for supporting a data transmission rate higher than 4th generation (4G) communication systems such as long term evolution (LTE). A method performed by a near-real time (RT) radio access network (RAN) intelligent controller (RIC) is provided. The method includes a step of receiving a RIC indication message from an E2 node, wherein the RIC indication message includes user equipment (UE)-related information, the UE-related information includes information for indicating the radio resource control (RRC) state, and the RRC state can be one from among a plurality of states including RRC connected, RRC inactive and RRC idle states.

12 Claims, 15 Drawing Sheets

(56) References Cited

U.S. PATENT DOCUMENTS

| | | | | |
|---|---|---|---|---|
| 2019/0082490 | A1 | 3/2019 | Zhang et al. | |
| 2019/0335527 | A1 | 10/2019 | Byun et al. | |
| 2020/0260324 | A1 | 8/2020 | Byun et al. | |
| 2020/0314719 | A1 | 10/2020 | Tofighbakhsh et al. | |
| 2020/0329381 | A1 | 10/2020 | Chou et al. | |
| 2022/0225264 | A1* | 7/2022 | Song | H04W 8/18 |
| 2023/0171592 | A1* | 6/2023 | Han | H04W 8/20 370/328 |
| 2023/0337170 | A1* | 10/2023 | Stjernholm | H04W 60/06 |

FOREIGN PATENT DOCUMENTS

| | | | |
|---|---|---|---|
| CN | 111565418 | A | 8/2020 |
| CN | 111642011 | A | 9/2020 |
| CN | 111698694 | A | 9/2020 |
| CN | 111835548 | A | 10/2020 |
| KR | 10-1728252 | B1 | 4/2017 |
| KR | 10-2196727 | B1 | 12/2020 |
| WO | 2019/158699 | A1 | 8/2019 |
| WO | 2020/131128 | A1 | 6/2020 |
| WO | 2021/198947 | A1 | 10/2021 |

OTHER PUBLICATIONS

Extended European Search Report dated Feb. 27, 2024, issued in a European Patent Application No. 21892377.9-1216.

O-RAN Alliance; O-RAN Working Group 3, Near-Real-time RAN Intelligent Controller, E2 Application Protocol (E2AP); O-RAN. WG3.E2AP-v01.01; Technical Specification; Jul. 15, 2020.

International Search Report with English translation dated Mar. 2, 2022; International Appln. No. PCT/KR2021/016576.

O-RAN, O-RAN Working Group 3 Near-Real-time RAN Intelligent Controller E2 Service Model (E2SM), RAN Control, ORAN.WG3. E2SM-RC-v01.00, Technical Specification, Aug. 10, 2021, pp. 1-262, XP093130657.

European Office Action dated Dec. 12, 2025, issued in European Patent Application No. 21892377.9.

Korean Office Action dated May 20, 2026, issued in Korean Patent Application No. 10-2023-7024135.

Thoralf Czichy, Nokia, 5G RAN optimization using the O-RAN software community's RIC (RAN Intelligent Controller), ONS Europe, Sep. 23, 2019.

O-RAN Alliance, LS on O-RAN Alliance & 3GPP Coordination on O-RAN Alliance Outputs, RP-192259, 3GPP TSG RAN Meeting #85, Newport Beach, USA, Sep. 17, 2019.

O-RAN Alliance, O-RAN Working Group 3 Near-Rear-time RAN Intelligent Controller E2 Service Model (E2SM), RAN Function Network Interface (NI), ORAN-WG3.E2SM-NI-v01.00.00, Technical Specification, Feb. 1, 2020.

Chinese Office Action dated Jul. 1, 2026, issued in Chinese Patent Application No. 202180076127.X.

Indian Office Action dated Jul. 29, 2026, issued in Indian Patent Application No. 202317039167.

* cited by examiner

| IE/Group Name | Presence | Range | IE type and reference | Semantics description |
|---|---|---|---|---|
| RAT type | M | | | |
| O-RAN UE ID | O | | | |
| RAN UE Group ID | O | | | |
| Bearer State | O | | | ROHC state |
| QoS flow to DRB mapping rules | O | | | |
| C-RNTI for Surce PCell | O | | | |
| Surce PCell Cell identity | O | | | |
| Surce PCell Physical Cell identity | O | | | |
| Radio Bearer Configuration | O | | | |
| > The list of SRBs | O | | | SRB1, SRB2, SRB3 |
| > The list of SRBs | O | | | |
| RRC State Information | O | | | Idle, Active, Inactive |
| Full I-RNTI | O | | | |
| Short I-RNTI | O | | | |
| RAN configuration parameters | O | | | |

FIG.9

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |
| RAN Function ID | M | | 9.2.8 | | YES | reject |
| RIC Subscription Details | M | | | | YES | reject |
| >RIC Event Trigger Definition | M | | 9.2.9 | | - | |
| >Sequence of Actions | | 1.. <maxofRICactionID> | | | EACH | ignore |
| >>RIC Action ID | M | | 9.2.10 | | - | |
| >>RIC Action Type | M | | 9.2.11 | | - | |
| >>RIC Action Definition | O | | 9.2.12 | | - | |
| >>RIC Subsequent Action | O | | 9.2.13 | | - | |

| IE/Group Name | Presence | Range | IE type and reference | Semantics description |
|---|---|---|---|---|
| RIC Action Definition | M | | OCTET STRING | Defined in RAN Function specific E2 Service Model |

| IE/Group Name | Presence | Range | IE type and reference | Semantics description |
|---|---|---|---|---|
| RIC Style Type | M | | x.x.x | |
| CHOICE Format | | | | |
| >E2SM-RC Action Definition Format 1 | M | | x.x.x.x | |

| IE/Group Name | Presence | Range | IE type and reference | Semantics description |
|---|---|---|---|---|
| Sequence of RAN Parameters | | 0.. <maxofActionParameters> | | |
| >RAN Parameter ID | M | | 8.3.7 | |
| >RAN Parameter Value | M | | 8.3.9 | |

| IE/Group Name | Presence | Range | IE type and reference | Semantics description |
|---|---|---|---|---|
| MinimuminfoSet | M | | x.x.x.x | |
| RAT type | M | | | |
| O-RAN UE ID | O | | | |
| RAN UE Group ID | O | | | |
| Bearer State | O | | | ROHC state |
| QoS flow to DRB mapping rules | O | | | |
| C-RNTI for Source PCell | O | | | |
| Source PCell Cell identity | O | | | |
| Source PCell Physical Cell identity | O | | | |
| Source SCell List | O | | | |
| > SCell Cell Identity | O | | | |
| > SCell Physical Cell Identity | O | | | |
| > The list of SRBs | O | | | SRB1, SRB2, SRB3 |
| > The list of DRBs | O | | | |
| RRC State Information | O | | | Idle, Active, Inactive |
| Full I-RNTI | O | | | |
| Short I-RNTI | O | | | |
| RAN Configuration parameters | O | | | |

FIG.12

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |
| RAN Function ID | M | | 9.2.8 | | YES | reject |
| RIC Action ID | M | | | | YES | reject |
| RIC Indication SN | M | | 9.2.9 | | - | |
| RIC Indication Type | | 1.. <maxofRICactionID> | | | EACH | ignore |
| RIC Indication Header | M | | 9.2.10 | | - | |
| RIC Indication Message | M | | 9.2.11 | | - | |
| RIC Call process ID | O | | 9.2.12 | | - | |

| IE/Group Name | Presence | Range | IE type and reference | Semantics description |
|---|---|---|---|---|
| RIC Indication header | M | | OCTET STRING | Defined in RAN Function specific E2 Service Model [3] |

| IE/Group Name | Presence | Range | IE type and reference | Semantics description |
|---|---|---|---|---|
| CHOICE Format | | | | |
| >E2SM-RC Indication Header Format 1 | M | | x.x.x.x.x | |

| IE/Group Name | Presence | Range | IE type and reference | Semantics description |
|---|---|---|---|---|
| MinimuminfoSet | M | | x.x.x.x | |
| RAT type | M | | | |
| O-RAN UE ID | O | | | |
| RAN UE Group ID | O | | | |
| Bearer State | O | | | ROHC state |
| QoS flow to DRB mapping rules | O | | | |
| C-RNTI for Source PCell | O | | | |
| Source PCell Cell identity | O | | | |
| Source PCell Physical Cell identity | O | | | |
| Source SCell List | O | | | |
| > SCell Cell Identity | O | | | |
| > SCell Physical Cell Identity | O | | | |
| Radio Beaer Configuration | O | | | |
| > The list of SRBs | O | | | SRB1, SRB2, SRB3 |
| > The list of DRBs | O | | | |
| RRC State Information | O | | | Idle, Active, Inactive |
| Full I-RNTI | O | | | |
| Short I-RNTI | O | | | |
| RAN Configuration parameters | O | | | |

FIG.13

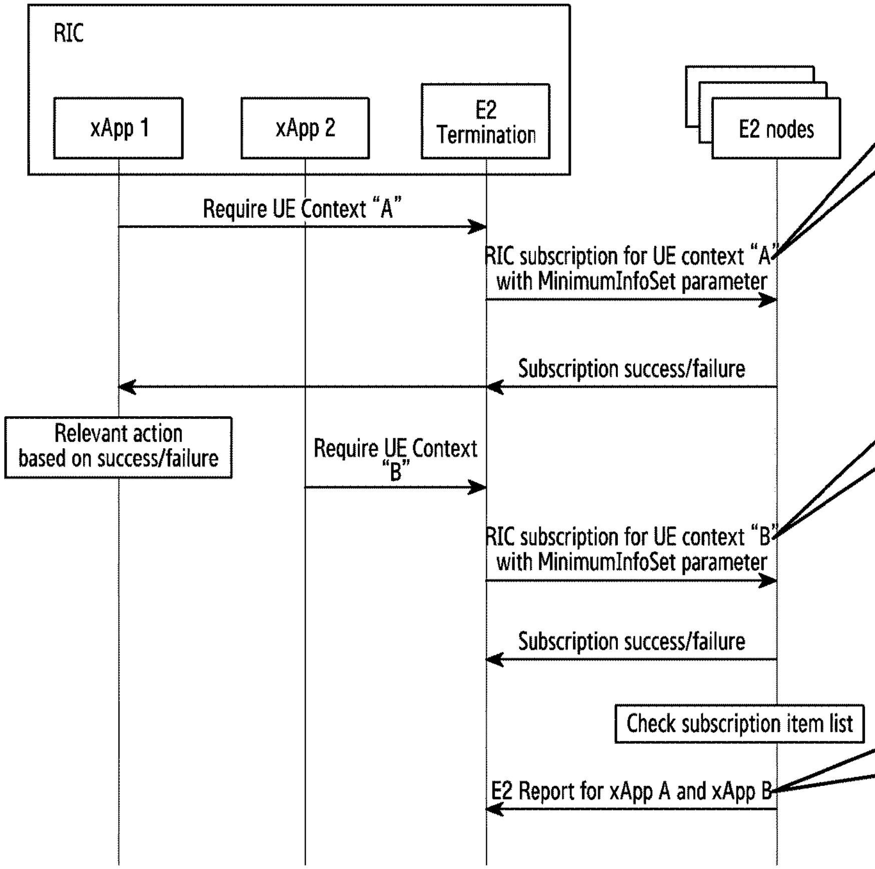

| IE/Group Name | Presence | Range | IE type and reference | Semantics description |
|---|---|---|---|---|
| MinimuminfoSet | M | | x.x.x.x | |
| RAT type | M | | | |
| O-RAN UE ID | O | | | |
| RAN UE Group ID | O | | | |
| Bearer State | O | | | ROHC state |
| QoS flow to DRB mapping rules | O | | | |
| C-RNTI for Source PCell | O | | | |
| Source PCell Cell identity | O | | | |
| Source PCell Physical Cell identity | O | | | |

| IE/Group Name | Presence | Range | IE type and reference | Semantics description |
|---|---|---|---|---|
| MinimuminfoSet | M | | x.x.x.x | |
| Source SCell List | O | | | |
| > SCell Cell Identity | O | | | |
| > SCell Physical Cell Identity | O | | | |
| Radio Beaer Configuration | O | | | |
| > The list of SRBs | O | | | SRB1, SRB2, SRB3 |
| > The list of DRBs | O | | | |
| RRC State Information | O | | | Idle, Active, Inactive |
| Full I-RNTI | O | | | |
| Short I-RNTI | O | | | |
| RAN Configuration parameters | O | | | |

| IE/Group Name | Presence | Range | IE type and reference | Semantics description |
|---|---|---|---|---|
| MinimuminfoSet | M | | x.x.x.x | |
| RAT type | M | | | |
| O-RAN UE ID | O | | | |
| RAN UE Group ID | O | | | |
| Bearer State | O | | | ROHC state |
| QoS flow to DRB mapping rules | O | | | |
| C-RNTI for Source PCell | O | | | |
| Source PCell Cell identity | O | | | |
| Source PCell Physical Cell identity | O | | | |
| Source SCell List | O | | | |
| > SCell Cell Identity | O | | | |
| > SCell Physical Cell Identity | O | | | |
| Radio Beaer Configuration | O | | | |
| > The list of SRBs | O | | | SRB1, SRB2, SRB3 |
| > The list of DRBs | O | | | |
| RRC State Information | O | | | Idle, Active, Inactive |
| Full I-RNTI | O | | | |
| Short I-RNTI | O | | | |
| RAN Configuration parameters | O | | | |

FIG.14

DEVICE AND METHOD FOR CONTROLLING E2 NODE IN WIRELESS COMMUNICATION SYSTEM

CROSS-REFERENCE TO RELATED APPLICATION(S)

This application is a continuation application, claiming priority under § 365(c), of an International application No. PCT/KR2021/016576, filed on Nov. 12, 2021, which is based on and claims the benefit of a Korean patent application number 10-2020-0151402, filed on Nov. 12, 2020, in the Korean Intellectual Property Office, and of a Korean patent application number 10-2020-0169973, filed on Dec. 7, 2020, in the Korean Intellectual Property Office, the disclosure of each of which is incorporated by reference herein in its entirety.

BACKGROUND

1. Field

The disclosure relates to an apparatus and a method for controlling an E2 node by a radio access network (RAN) intelligent controller (RIC) in a radio access network. The disclosure relates to an apparatus and a method for controlling an E2 node through an E2 message following an open radio access network (O-RAN) in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (millimeter Wave (mmWave)) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Due to commercialization of a 5G system or new radio or next radio (NR) to satisfy demands for radio data traffic, a service having a high data transmission rate is provided to a user through the 5G system like 4G, and it is expected that wireless communication services having various purposes such as the Internet of things and services requiring high reliability for a specific purpose will be provided. In the current system in which the 4th generation communication system and the 5th generation system coexist, an open radio access network (O-RAN) established together by operators and equipment providing companies defines a new network element (NE) and the interface standard on the basis of the existing 3rd generation partnership project (3GPP) standard and suggests an O-RAN architecture.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for controlling an E2 node by a radio access network (RAN) intelligent controller (RIC) in a wireless communication system on the basis of the discussion.

Another aspect of the disclosure is to provide an apparatus and a method for configuring an E2 node in a specific mode by a RIC in order to make the E2 node operate according to the control of the RIC.

Additional aspects will be set forth in part in the description which follows and, in part, will be apparent from the description, or may be learned by practice of the presented embodiments.

In accordance with an aspect of the disclosure, a method performed by a near-real time (RT) RIC is provided. The method includes receiving an RIC indication message from an E2 node, wherein the RIC indication message includes user equipment (UE)-related information, the UE-related information includes information indicating a radio resource control (RRC) state of a UE, and the RRC state is one of a plurality of states including an RRC-connected state, an RRC-inactive state, and an RRC-idle state.

In accordance with another aspect of the disclosure, a method performed by an E2 node is provided. The method includes transmitting an RIC indication message to a near-RT RIC, wherein the RIC indication message includes UE-related information, the UE-related information includes information indicating an RRC state of a UE, and the RRC state is one of a plurality of states including an RRC-connected state, an RRC-inactive state, and an RRC-idle state.

In accordance with another aspect of the disclosure, an apparatus of a near-RT RIC is provided. The apparatus includes at least one transceiver and at least one processor, wherein the at least one processor is configured to receive an RIC indication message from an E2 node, the RIC indication message includes UE-related information, the UE-related information includes information indicating an RRC state of a UE, and the RRC state is one of a plurality of states including an RRC-connected state, an RRC-inactive state, and an RRC-idle state.

In accordance with another aspect of the disclosure, an apparatus of an E2 node is provided. The apparatus includes at least one transceiver and at least one processor, wherein the at least one processor is configured to transmit a RIC indication message to a near-RT RIC, the RIC indication message includes UE-related information, the UE-related information includes information indicating an RRC state of a UE, and the RRC state is one of a plurality of states including an RRC-connected state, an RRC-inactive state, and an RRC-idle state.

In accordance with another aspect of the disclosure, a method performed by a RIC is provided. The method includes receiving a configuration message from an E2 node, generating a control message on the basis of the configuration message, and transmitting the control message to the E2 node, wherein the control message includes a message which the E2 node transmits to another E2 node.

An apparatus and a method according to various embodiments allow a RIC to control an E2 node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates an example in transmission of UE information through an E2 report message according to an embodiment of the disclosure;

FIG. 12 illustrates an example of UE information according to an embodiment of the disclosure;

FIG. 13 illustrates an example of UE information according to an embodiment of the disclosure; and FIG. 14 illustrates signaling between the E2 node and the RIC based on a UE context request for each xApp according to an embodiment of the disclosure.

Throughout the drawings, it should be noted that like reference numbers are used to depict the same or similar elements, features, and structures.

DETAILED DESCRIPTION

Figure 1:
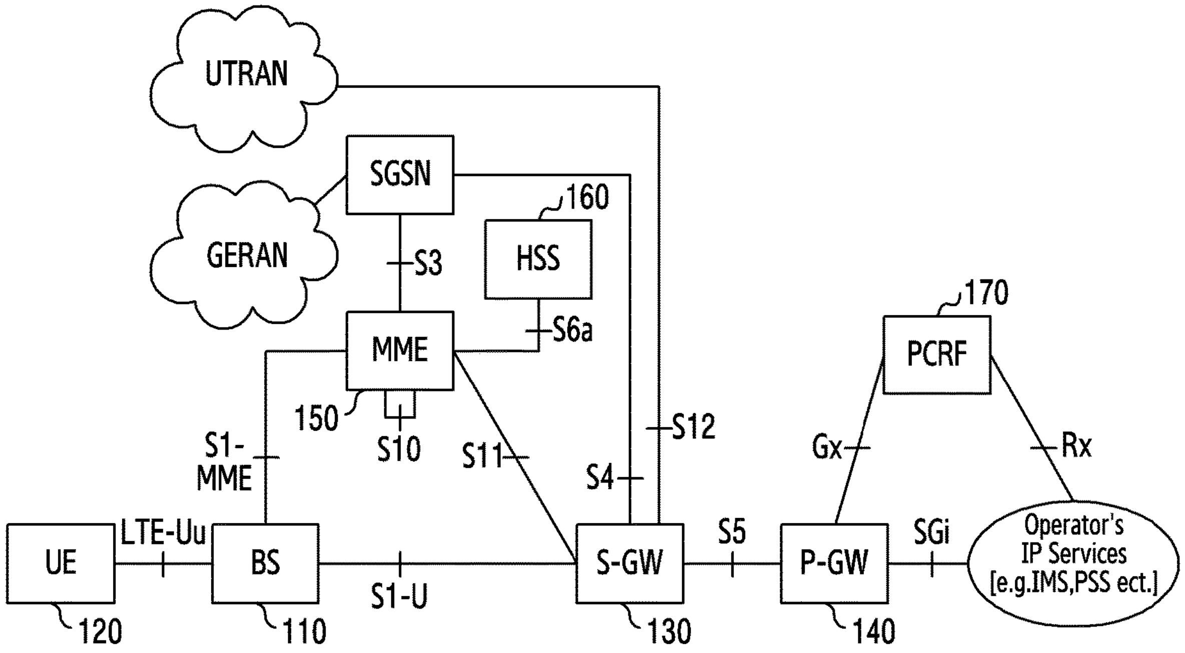
FIG. 1 illustrates an example of a 4th generation (4G) long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A hardware-based approach will be described as an example in various embodiments of the disclosure to be described hereafter. However, various embodiments of the disclosure include technology which uses both hardware and software, and accordingly various embodiments of the disclosure do not exclude a software-based approach.

Hereinafter, the disclosure relates to an apparatus and a method for performing a subscription procedure between a device within a radio access network (RAN) and a device controlling the RAN in a wireless communication system. Specifically, the disclosure relates to an apparatus and a method for measuring the performing for each user equipment (UE) in an E2 interface, and resource management for each slice of a base station in a radio access network. The disclosure relates to an apparatus and a method for transmitting a container-based measurement message when a service event for the base station according to the open radio access network (O-RAN) standard using an E2 message of a wireless communication system is generated.

Terms for signals, terms indicating channels, terms indicating control information, terms indicating network entities, and terms indicating components of a device used in the following explanation are illustrated for convenience of description. Accordingly, the disclosure is not limited to the terms to be described, and other terms having the same technical meaning may be used.

Also, in the disclosure, to determine whether a specific condition is satisfied or fulfilled, expressions such as greater than or less than are used but are merely an expression by way of example and do not exclude expressions of equal to or greater than or equal to or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

In addition, the disclosure describes various embodiments using terms used in some communication standards (e.g., 3GPP), but this is only an example for description. Various embodiments of the disclosure may be easily modified and applied in other communication systems.

According to the commercialization of a 4th generation (4G)/5th generation (5G) communication system (for example, new radio (NR)), it is required to support a differentiated service to a user in a virtualized network. The 3GPP is a joint research project between mobile communication-related organizations, and aims at making a 3rd generation mobile communication system standard which can be applied worldwide within a range of an IMT-2000 project of the international telecommunications union (ITU). The 3GPP was established in December 1998, and the 3GPP standard is based on an advanced GSM standard and includes service architectures of both radio and core network in a standardization range. Accordingly, an open radio access network (O-RAN) newly defines a radio unit (RU), a digital unit (DU), a central unit (CU)-control plane (CP), and a CU-user plane (UP) which are nodes included in a 3GPP network entity (NE) and a base station as an O-RAN-RU (O-RU), an O-DU, an O-CU-CP, and an O-CU-UP, and has additionally standardized a near-real time (RT) radio access network (RAN) intelligent controller (RIC). The disclosure is to support an operator-specific service model in an E2 interface through which the RIC makes a request for a service to the O-DU, the O-CU-CP, or the O-CU-UP. The O-DU, the O-CU-CP, and the O-CU-UP may be understood as entities included in an RAN which can operate according to the RAN standard and may be referred to as E2 nodes. An interface with the entities included in the RAN which can operate according to the RAN standard between the RIC and the E2 nodes uses an E2AP (application protocol).

The RIC is a logical node which can collect information in a cell site in which the UE performs transmission/reception to/from the O-DU, the O-CU-CP, or the O-CU-UP. The RIC may be implemented in the form of a server intensively disposed in one physical place. The connection between the O-DU and the RIC, and the connection between the O-CU-CP and the RIC, and the connection between the O-CU-UP and the RIC may made through Ethernet. To this end, interface standards for communication between the O-DU and the RIC, between the O-CU-CP and the RIC, and between the O-CU-UP and the RIC are needed, and the definition of message standards of E2-DU, E2-CU-CP, and E2-CU-UP, and procedures between the RIC and the O-CU, the O-CU-CP, and the O-CU-UP are needed. Particularly, supporting of the differentiated service to the user in the virtualized network is required, and the definition of functions of messages of the E2-DU, the E2-CU-CP, and the E2-CU-UP is needed to support the service for wide cell coverage through the concentration of call processing messages/functions generated in the O-RAN on the RIC.

The RIC may communicate with the O-DU, the O-CU-CP, and the O-CU-UP by using an E2 interface and generate and transmit a subscription message, so as to configure an event generation condition. Specifically, the RIC may generate an E2 subscription request message and transfer the E2 subscription request message to an E2 node (for example, the O-CU-CP, the O-CU-UP, or the O-DU) to configure a call processing event. Further, after configuring the event, the E2 node transfers a subscription request response message to the RIC.

The E2 node may transmit the current state to the RIC through an E2 indication/report. The RIC may provide the control for the O-DU, the O-CU-CP, or the O-CU-UP through an E2 control message. Various embodiments of the disclosure propose an E2 indication message for transmitting measurement information in units of UEs according to each cycle configured by the O-DU in a subscription event condition. Further, various embodiments of the disclosure propose a message for controlling resources which the RIC transmits to the O-DU.

FIG. 1 illustrates an example of a 4th generation (4G) long term evolution (LTE) core system according to an embodiment of the disclosure.

Referring to FIG. 1, the LTE core system includes a base station (BS) 110, a UE 120, a serving gateway (S-GW) 130, a packet data network gateway (P-GW) 140, a mobility management entity (MME) 150, a home subscriber server (HSS) 160, and a policy and charging rule function (PCRF) 170.

The BS 110 is a network infrastructure element that provides radio access to the UE 120. For example, the BS 110 is a device for collecting state information such as a buffer state, available transmission power, and a channel state of the UE 120 to perform scheduling. The BS 110 has coverage defined in a predetermined geographical area on the basis of the range within which a signal can be transmitted. The BS 110 is connected to the MME 150 through an S1-MME interface. The BS 110 may be referred to as "access point (AP)", an "evolved NodeB (eNB)", a "wireless point", a "transmission/reception point (TRP)", or other terms having the equivalent technical meaning, as well as "base station".

The UE 120 is a device used by a user and performs communication with the BS 110 through a radio channel. According to circumstances, the UE 120 may be operated without involvement of the user. That is, at least one of the UEs 120 may be a device that performs machine-type communication (MTC), and may not be carried by the user. The UE 120 may be referred to as "user equipment (UE)", "mobile station", "subscriber station", "customer-premises equipment (CPE)", "remote terminal", "wireless terminal", "user device", or other terms having the equivalent technical meaning, as well as "terminal".

The S-GW 130 provides data bearers and generates or controls data bearers according to the control of the MME 150. For example, the S-GW 130 processes a packet arriving from the BS 110 or a packet to be forwarded to the BS 110. Further, the S-GW 130 may serve as an anchor during handover between BSs of the UE 120. The P-GW 140 may function as a connection point with an external network (for example, an Internet network). Further, the P-GW 140 allocates an IP (Internet protocol) address to the UE 120 and serves as an anchor for the S-GW 130. In addition, the P-GW 140 may apply a quality of service (QoS) policy of the UE 120 and manage account data.

The MME 150 manages mobility of the UE 120. Further, the MME 150 may perform authentication of the UE 120, bearer management, and the like. That is, the MME 150 performs management of mobility of the UE and various control functions. The MME 150 may interwork with an SGSN (serving GPRS support node).

The HSS 160 stores key information and a subscriber profile for authentication of the UE 120. The key information and the subscriber profile are transferred from the HSS 160 to the MME 150 when the UE 120 accesses the network.

The PCRF 170 defines a policy and a rule for charging. Stored information may be transferred from the PCRF 180 to the P-GW 140, and the P-GW 140 may perform the control (For example, QoS management, charging, and the like) for the UE 120 on the basis of information provided from the PCRF 180.

A carrier aggregation (GA) technology is a technology for aggregating a plurality of component carriers and allowing one UE to simultaneously use the plurality of component carriers to transmit and receive signals, thereby increasing frequency usage efficiency in a viewpoint of the UE or the BS. Specifically, according to the CA technology, the UE and the BS may transmit and receive signals through a broadband using a plurality of component carriers in each of an uplink (UL) and a downlink (DL), in which case the respective component carriers are located in different frequency bands. Hereinafter, the uplink is a communication link through which the UE transmits a signal to the BS, and the downlink is a communication link through which the BS transmits a signal to the UE. At this time, the number of uplink component carriers and the number of downlink component carriers may be different from each other.

A dual connectivity/multi connectivity technology is a technology in which one UE is connected to a plurality of different BSs and transmits and receives signals simultaneously using carriers within the plurality of BSs located in different frequency bands, thereby increasing frequency usage efficiency in a viewpoint of the UE or the BS. The UE may be simultaneously connected to a first BS (for example, a BS providing a service through an LTE technology or a 4th-generation mobile communication technology) and a second BS (for example, a BS providing a service through a new radio (NR) technology or a 5th-generation (5G) mobile communication technology) to transmit and receive traffic. At this time, frequency resources used by respective BSs may be located in different bands. As described above, a scheme for operation based on dual connectivity of LTE and NR may be referred to as 5G non-standalone (NSA).

Figure 2A:
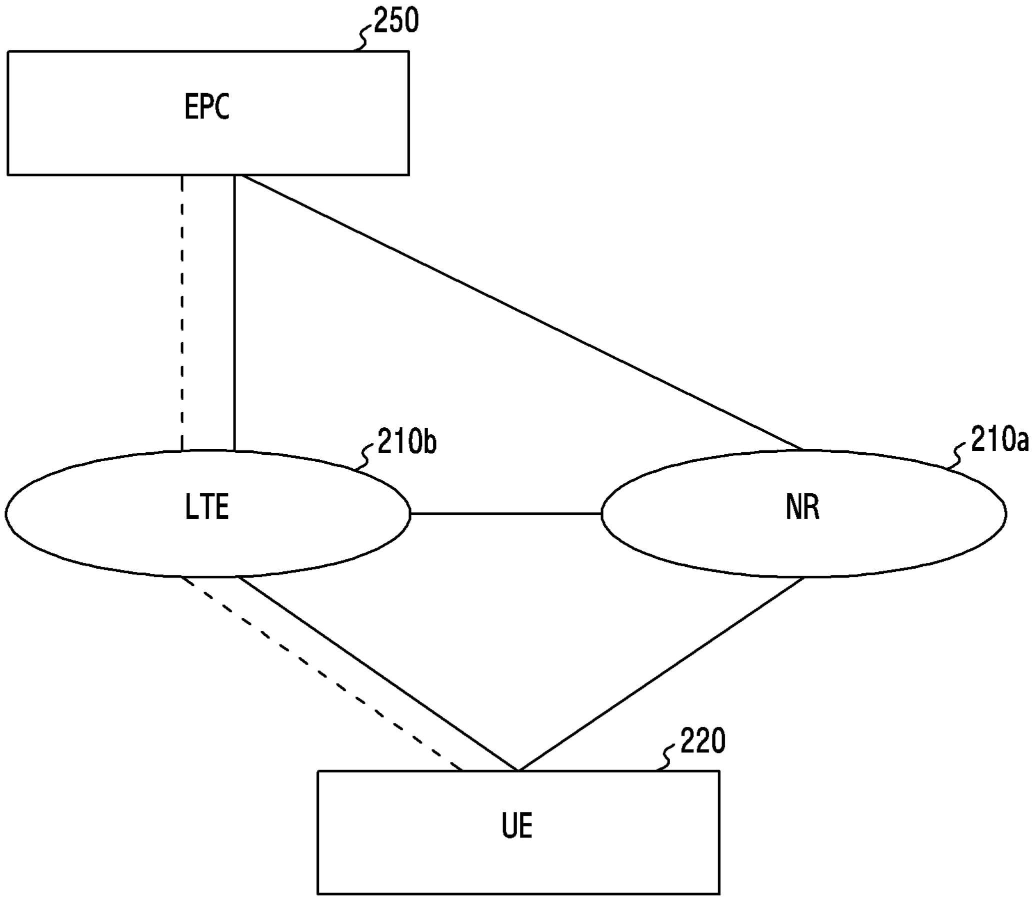
FIG. 2A illustrates an example of a 5th generation (5G) non-standard alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210*a*, an LTE RAN 210*b*, a UE 220, and an EPC 250. The NR RAN 210*a* and the LTE RAN 210*b* are connected to the EPC 250, and the UE 220 may simultaneously receive services from one or all of the NR RAN 210*a* and the LTE RAN 210*b*. The NR RAN 210*a* includes at least one NR gNB, and the LTE RAN 210*b* may include at least one LTE eNB. The NR gNB may be referred to as a '$5^{th}$-generation node (5G node)', a "next generation nodeB or g nodeB (gNB)' or other terms having the equivalent technical meaning thereto. Further, the NG gNB may have a structure divided into a central unit (CU) and a digital unit (DU), and the UE may have a structure divided into a CU-control plane (CP) unit and a CU-user plane (UP) unit.

In the structure illustrated in FIG. 2, the UE 220 may perform radio resource control (RRC) access through the first BS (for example, a BS belonging to the LTE RAN 210*b*) and receive a service of a function (for example, connection management, mobility management, or the like) provided on a control plane. The UE 220 may receive additional radio resources for transmitting and receiving data through the second BS (for example, a BS belonging to the NR RAN 210*a*). The dual connectivity technology using LTE and NR may be referred to as evolved universal terrestrial radio access (E-UTRA)-NR dual connectivity (EN-DC). Similarly, the dual connectivity technology in which the first BS uses the NR technology and the second BS uses the LTE technology is referred to as NR-E-UTRA dual connectivity (NE-DC). Various embodiments may be applied to multi-connectivity in various forms and the carrier aggregation technology. Various embodiments may be applied to the case in which a first system using a first communication technology and a second system using a second communication technology are implemented in one device or the case in which the first BS and the second BS are positioned in the same geographical location.

Figure 2B:
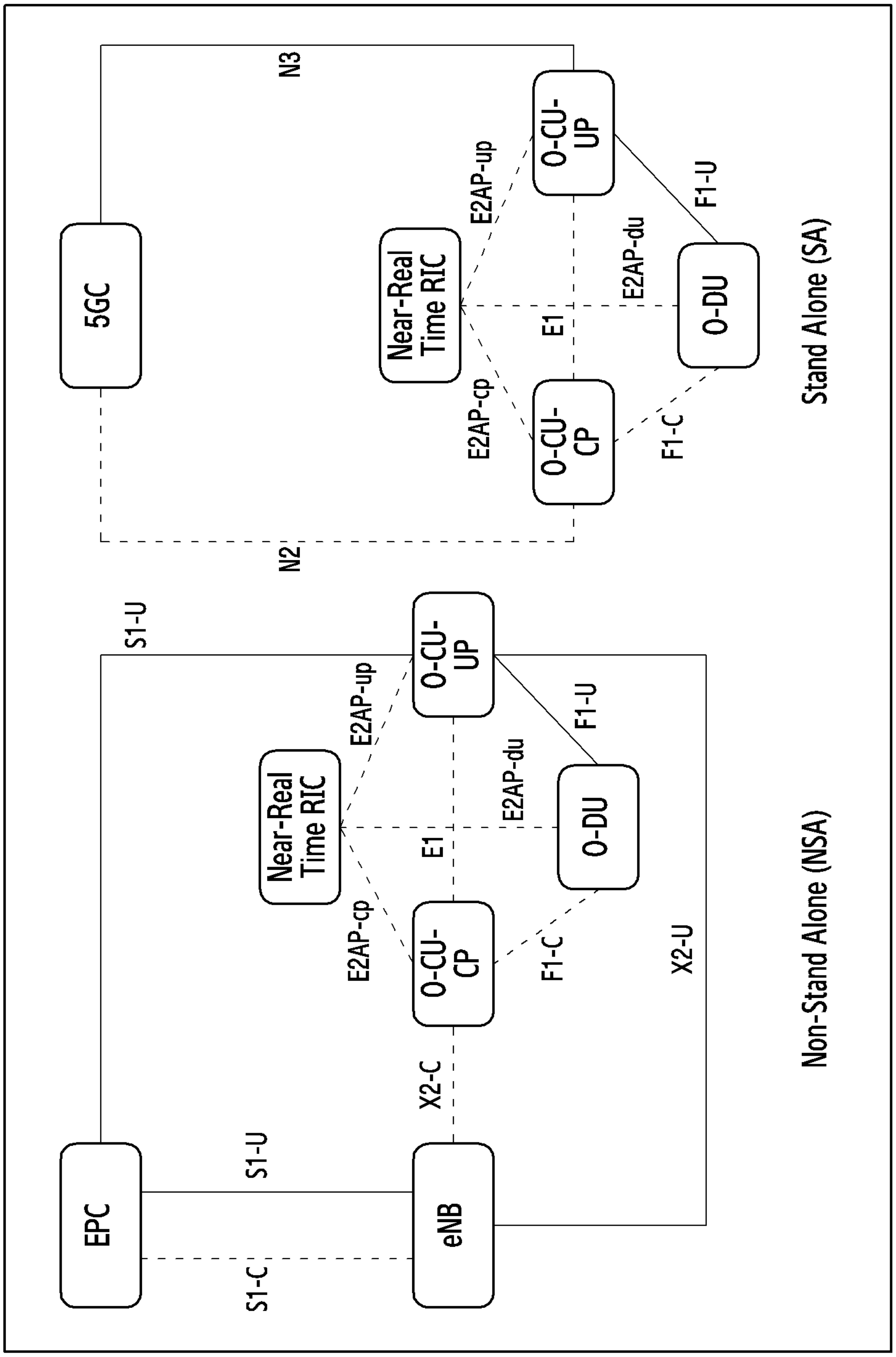
FIG. 2B illustrates an example of architecture for an open radio access network (O-RAN) according to an embodiment of the disclosure.

FIG. 2B illustrates an example of architecture for an O-RAN according to an embodiment of the disclosure. For the purpose of E2-SM-KPIMON (key performance indicator (KPI) monitoring) of an E2 service model, an O-RAN non-standalone mode within multi-connectivity operation using E-UTRA and NR radio access technology is considered, but it may be assumed that an E2 node is in an O-RAN standalone mode.

Referring to FIG. 2B, in deployment of the O-RAN non-standalone mode, the eNB is connected to the EPC through an S1-C/S1-U interface and connected to the O-CU-CP through an X2 interface. The O-CU-CP for deployment of the O-RAN standalone mode may be connected to a 5G core (5GC) through an N2/N3 interface.

Figure 3:
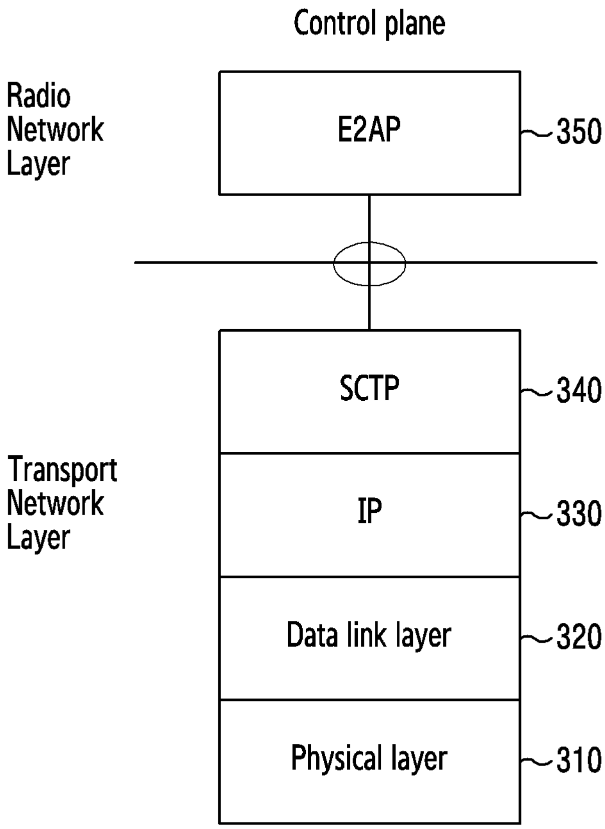
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure. Referring to FIG. 3, a control plane includes a transport network layer and a radio network layer. The transport network layer includes a physical layer 310, a data link layer 320, an Internet protocol (IP) 330, a stream control transmission protocol (SCIP) 340.

The radio network layer includes an E2AP 350. The E2AP 350 is used to transmit a subscription message, an indication message, a control message, a service update message, and a service query message, and is transmitted by the SCTP 340 and a higher layer of the IP 330.

Figure 4:
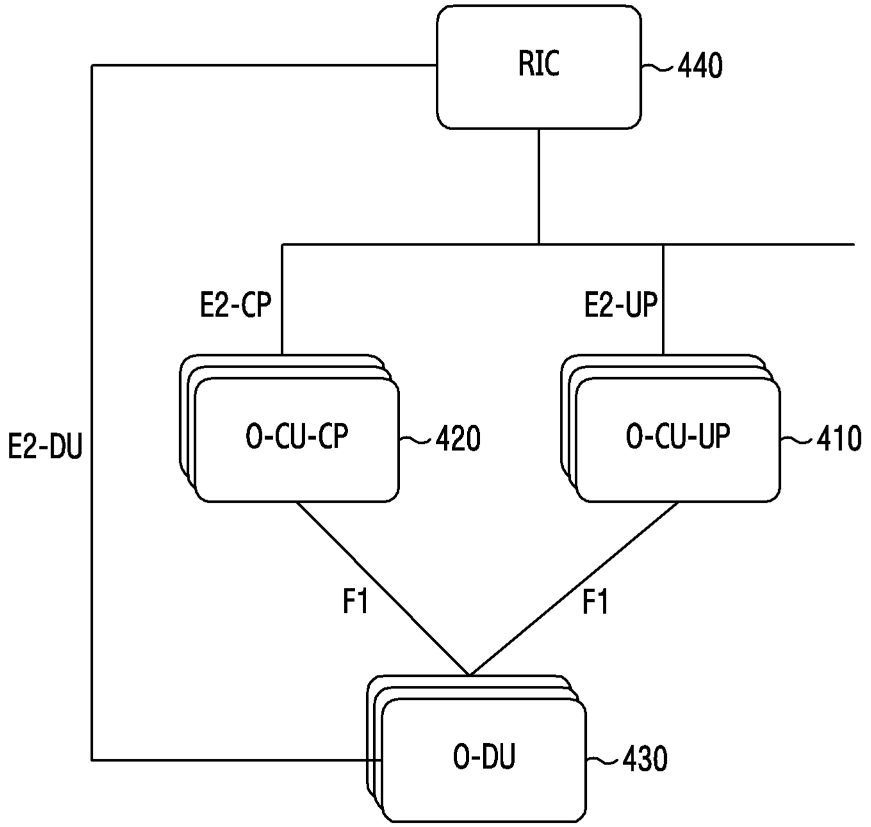
FIG. 4 illustrates an example of a connection between the base station (BS) and a radio access network (RAN) intelligence controller (RIC) in a radio access network according to an embodiment of the disclosure.

FIG. 4 illustrates an example of a connection between the BS and a radio access network intelligence controller (RIC) in a radio access network according to ab embodiment of the disclosure.

Referring to FIG. 4, an RIC 440 is connected to an O-CU-CP 420, an O-CU-UP 410, and an O-DU 430. The RIC 440 is a device for customizing RAN functionality for a new service or regional resource optimization. The RIC 440 may provide function of network intelligence (for example, policy enforcement or handover optimization), resource assurance (for example, radio-link management or advanced self-organized-network (SON), resource control (for example, load balancing or slicing policy), and the like. The RIC 440 may communicate with the O-CU-CP 420, the O-CU-UP 410, and the O-DU 430. The RIC 440 can be connected to each node through an E2-CP, an E2-UP, or an E2-DU interface. Further, an interface between the O-CU-CP and the DU or between the O-CU-UP and the DU may be referred to as an F1 interface. In the following description, the DU may be interchangeably used with the O-DU, the CU-CP may be interchangeably used with the O-CU-CP, and the CU-UP may be interchangeably used with the O-CU-UP.

FIG. 4 illustrates one RIC 440, but there may be a plurality of RICs according to an embodiment of the disclosure. A plurality of RICs may be implemented in a plurality of hardware positioned in the same physical location or implemented through virtualization using one hardware.

Figure 5:
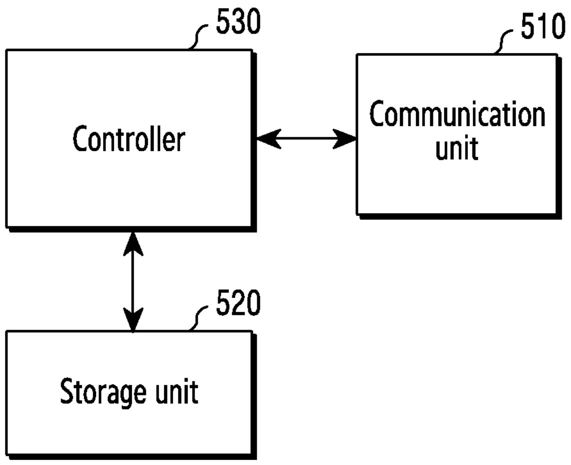
FIG. 5 illustrates a configuration of a device in a radio access network according to an embodiment of the disclosure.

FIG. 5 illustrates a configuration of a device according to an embodiment of the disclosure. The structure illustrated in FIG. 5 may be understood as a configuration of a device having at least one function of the RIC, the O-CU-CP, the O-CU-UP, and the O-DU of FIG. 5. The suffix "-unit" or "-er" used hereinafter may refer to a unit for processing at least one function or operation, and may be implemented as hardware, software, or a combination of hardware and software.

Referring to FIG. 5, a core network device includes a communication unit 510, a storage unit 520, and a controller 530.

The communication unit 510 provides an interface for communicating with other devices within the network. That is, the communication unit 510 converts a bitstream transmitted from the core network device to another device into a physical signal and converts a physical signal received from another device into a bitstream. That is, the communication unit 510 may transmit and receive signals. Accordingly, the communication unit 510 may be referred to as a modem, a transmitter, a receiver, or a transceiver. At this time, the communication unit 510 may allow the core network device to communicate with other devices or the system via a backhaul connection (for example, a wired backhaul or a wireless backhaul) or via the network.

The storage unit 520 stores data such as a basic program for the operation of the core network device, an application program, and configuration information. The storage unit 520 may include volatile memory, nonvolatile memory, or a combination of volatile memory and nonvolatile memory. The storage unit 520 provides stored data in response to a request from the controller 530.

The controller 530 controls the overall operation of the core network device For example, the controller 530 transmits and receives signals through the communication unit 510. The controller 530 records data in the storage unit 520 and reads the same. To this end, the controller 530 may include at least one processor. According to various embodiments, the controller 530 may control the device to perform operations according to various embodiments described in the disclosure.

Figure 6:
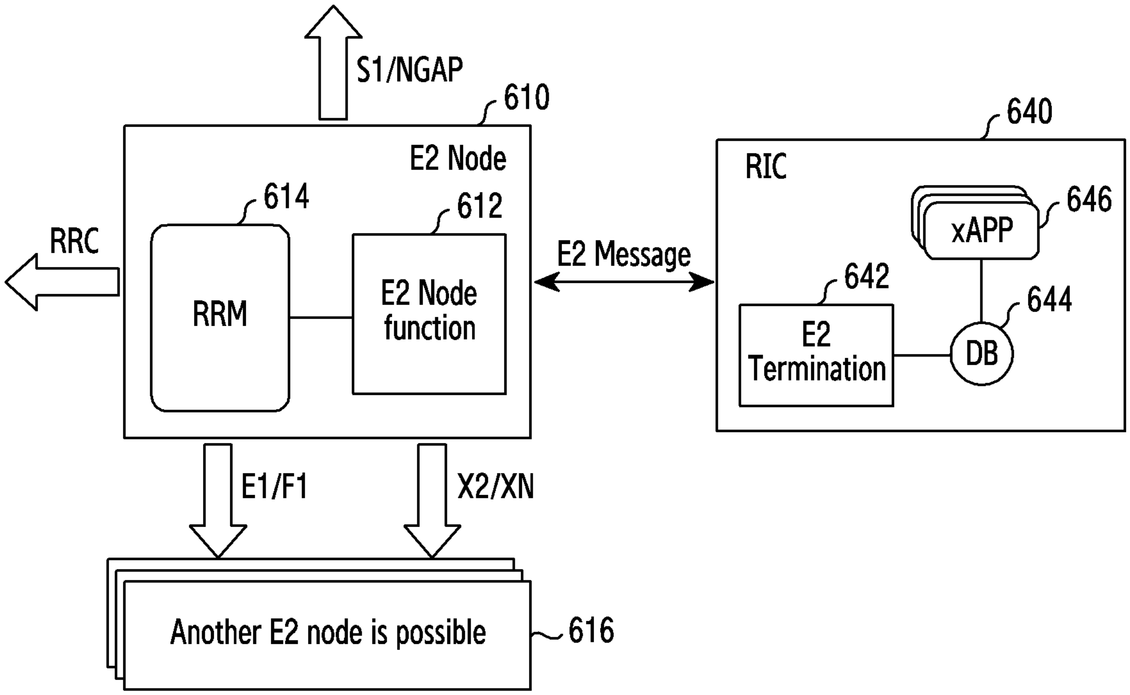
FIG. 6 illustrates a logical function related to an E2 message of an E2 node and an RIC in a radio access network according to an embodiment of the disclosure.

FIG. 6 illustrates a logical function related to an E2 message of an E2 node and an RIC in a radio access network according to an embodiment of the disclosure.

Referring to FIG. 6, an RIC 640 and an E2 node 610 may transmit or receive an E2 message therebetween. For example, the E2 node 610 may be an O-CU-CP, an O-CU-UP, an O-DU, or a BS. A communication interface of the E2 node may be determined according to the type of the E2 node 610. For example, the E2 node 610 may communicate with another E2 node 616 through an E1 interface or an F1 interface. Alternatively, for example, the E2 node 610 may communicate with the E2 node 616 through an X2 interface or an XN interface. Alternatively, for example, the E2 node 610 may perform communication through an S1 interface or an next generation application protocol (NGAP) interface (that is, an interface between an next generation (NG) RAN node and an AMF).

The E2 node 610 may include an E2 node function 612. The E2 node function 612 is a function corresponding to a specific xApp (application S/W) 646 installed in the RIC 640. For example, in the case of a KPI monitor, a KPI monitor collection S/W is installed in the RIC 640, and the E2 node 610 may include the E2 node function 612 of transmitting an E2 message including KPI parameters to an E2 terminal 642 located in the RIC 640 after generating the KPI parameters. The E2 node 610 may include radio resource management (RRM) 614. The E2 node 610 may manage resources provided to a radio network for the UE.

The E2 termination 642 located in the RIC 640 is an end of the RIC 640 for the E2 message and performs a function of analyzing the E2 message transmitted by the E2 node 610 and then transmitting the same to the xApp 646. A database (DB) 644 located in the RIC 640 may be used for the E2 termination 624 or the xApp 646. The E2 node 610 illustrated in FIG. 6 is an end of at least one interface and may be understood as an end of messages transmitted to the UE, a neighboring BS, or the core network.

Figure 7:
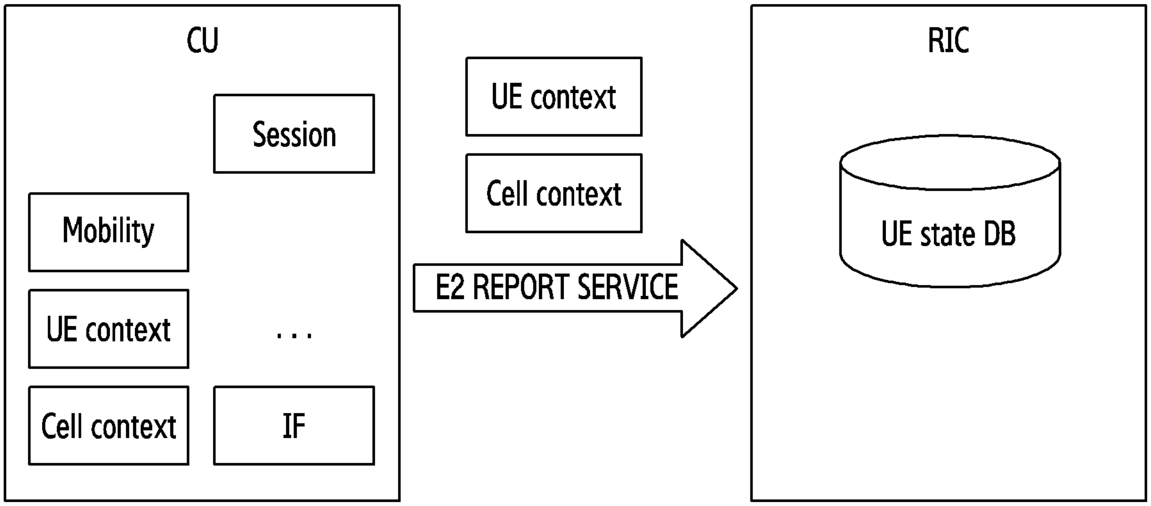
FIG. 7 illustrates examples of sharing user equipment (UE) context or cell context information between a central unit (CU) node and a RIC according to an embodiment of the disclosure.

FIG. 7 illustrates examples of sharing UE context or cell context information between a CU node and an RIC according to an embodiment of the disclosure. The CU node is an O-CU and stores state information of the UE according to RRC states of UEs. The stored information of the UE may be transferred to the RIC by an E2 REPORT message. According to an embodiment, the RRC state of the UE may be one of an RRC CONNECTED state, an RRC IDLE state, and an RRC inactive state.

Figure 8:
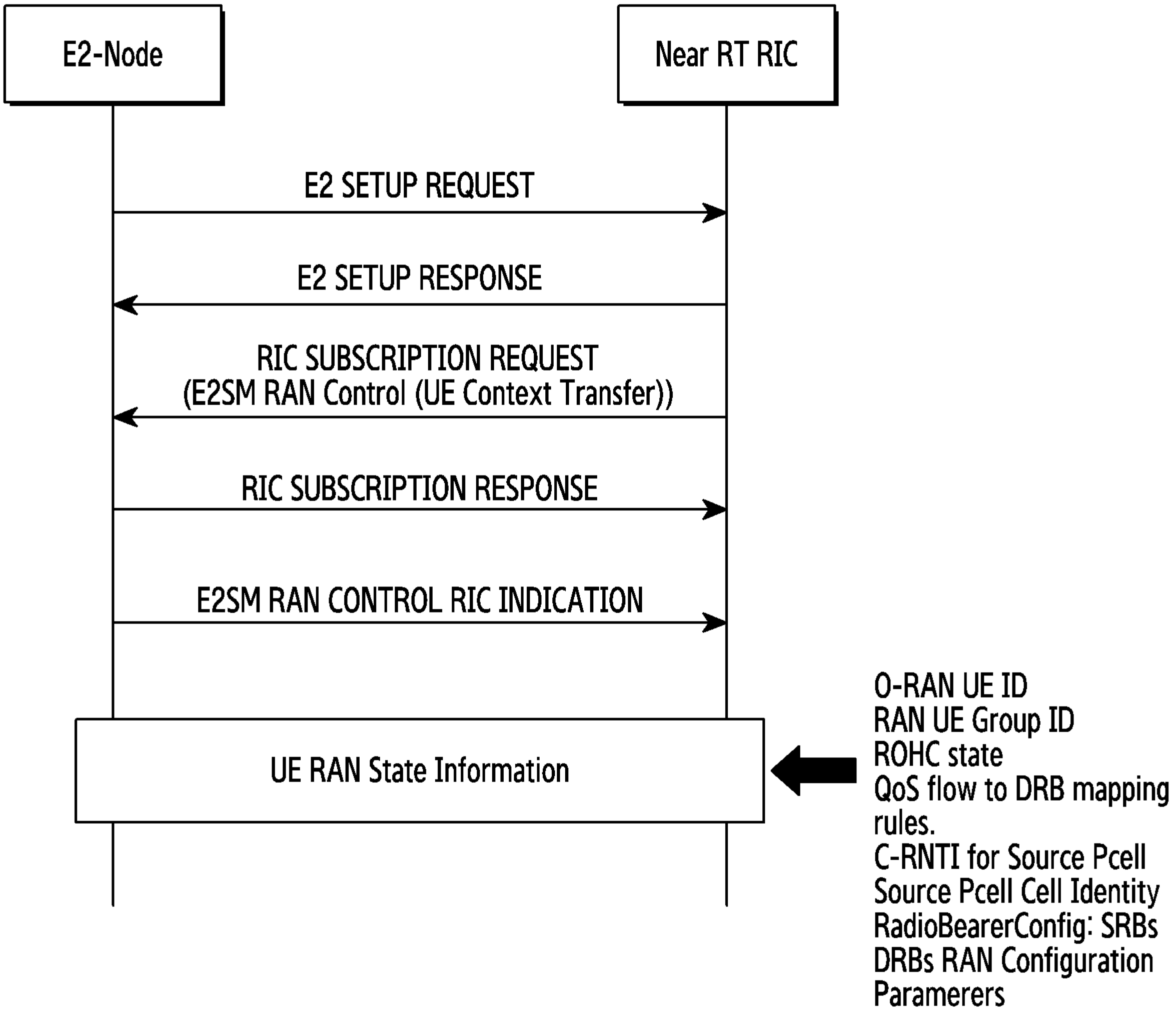
FIG. 8 illustrates signaling for sharing UE context or cell context information between an E2 node and an RIC according to an embodiment of the disclosure.

FIG. 8 illustrates signaling for sharing UE context or cell context information between an E2 node and an RIC according to an embodiment of the disclosure.

According to an embodiment, the E2 node may be an O-CU. Although a SET UP procedure, an RIC subscription procedure, an RIC indication message transmission procedure, and an RIC control message transmission procedure (not shown) are sequentially illustrated, various embodiments of the disclosure are not limited to the above order or procedures. That is, in some embodiments, the E2 node and the RIC may independently perform the E2 configuration procedure. In some embodiment, the E2 node and the RIC may independently perform the subscription procedure. Meanwhile, according to another embodiment, as described above, an E2 configuration response message may include a subscription request message. In some embodiments, the E2 node and the RIC may independently perform the indication procedure. The E2 node may transfer UE context information through an E2SM RAN CONTROL RIC INDICATION message by UE Context Transfer configured by the RIC. The UE context information includes at least one piece of the following information but is not limited to the UE information.

O-RAN UE ID

Group ID

Robust header compression (ROHC) state (for example, initialization and refresh (IR), first order (FO), and second order (SO) (ROHC compressor is in one of the three states. The initialization and refresh (IR) state is a state in which a compressor has been just generated or reset, and all packet headers are transmitted therein. In the first order (FO) state, the compressor recognizes and stores static fields such as an IP address and a port number. Further, in the state, the compressor transmits a dynamic packet field difference. That is, the FO state is a state in which the static fields are compressed and the dynamic fields are also partially compressed. In the second order (SO) state, the compressor compresses all dynamic fields such as an RTP sequence number and transmits only a logical sequence number and some checksums for verifying the next packet. In general, all static fields and most dynamic fields are compressed in the FO state, and all dynamic fields are periodically compressed using the sequence number and checksums in the SO state.

- quality of service (QoS) flow to data radio bearer (DRB) mapping rules.
- C-radio network temporary identifier (RNTI) for Source Pcell Source PCell CellIdentity Source PCell Physical Cell Identity RadioBearerConfig: signaling radio bearers (SRBs) DRBs RAN Configuration Parameters FIG. 9 illustrates an example in transmission of UE information through an E2 report message according to an embodiment of the disclosure.

Referring to FIG. 9, an example of a UE RAN state message located in a message body indicated by an E2SM indication header supported by an O-RAN E2 service model used by E2SM RAN control according to various embodiments of the disclosure is illustrated. The UE RAN state message may include at least one of 'RAT Type', 'O-RAN UE ID', 'RAN UE Group ID', Bearer State, QoS Flow to DRB mapping Rules, C-RNTI for Source PCell, Source PCell Cell Identity, Source PCell Physical Cell Identity, Radio Bearer Configuration (SRB list and DRB list), I-RNTI (or full I-RNTI/short I-RNTI), and RAN Configuration parameters. 'M' represents mandatory and '0' represents optional. The RAT Type is a type of a radio access technology (RAT) and defines LTE or NR. The O-RAN UE ID is a unique ID of the UE managed by the near-RT RIC associated with a C-RNTI, a temporary mobile subscriber identity (TMSI), a globally unique temporary identifier (GUTI), or the like managed by the BS. The RAN UE GROUP ID is an ID of a service group to which the UE allocated by the MME/AMF (access and mobility management function) belongs. For example, the RAN UE GROUP ID may include an service profiling identity (SPID) and/or an radio access type/frequency of selection priority (RFSP). The bearer state is a state of a PDCP bearer for each DRB of the UE and includes an ROHC state. The QoS Flow to RBB mapping Rule is a rule for mapping QoS flow to the DRB in RAN. The C-RNTI for Source PCell is a C-RNTI value used by the UE in a source PCell, the Physical Cell Identity of the Source PCell is a PhysCellId of the Source PCell and has a physical cell identity (PCI) value of the Source Pcell, and the Source PCell Cell Identity is a Cell Identity and has an NR cell global identifier (NR CGI) value. The Radio Bearer Configuration value is a signal radio bearer (SRB) and a data radio bearer (DRB) value currently used by the UE. The RRC State Information indicates the current RRC state value of the UE. The UE may be in one state of the three states such as an idle mode, a connected mode, and an inactive mode. The I (inactive)-RNTI is an RNTI for the inactive state of the UE. The I-RNTI may include at least one of a Full I-RNTI or a Short I-RNTI. The I-RNTI is an ID storing the state of the UE when the UE transitions to the inactive state. The RAN Configuration parameter defines RRC parameter(s) defined in the 3GPP standard as well as the above-described UE state IE.

As illustrated in FIG. 9, information indicating the RRC states of the UE may be collected for each UE. To this end, according to an embodiment, the E2 node (for example, CU) may collect the corresponding information and configure information per cell. Further, according to an embodiment, the E2 node (for example, CU) may collect the corresponding information and configure information per RRC state. At this time, the transmitted information may include UE lists or group IDs for each RRC state. An example of transmission of UE information through the E2 report message according to various embodiments is described. Referring to FIG. 9, an example of a UE RAN state message located in a message body indicated by an E2SM indication header supported by an O-RAN E2 service model used by E2SM RAN control according to various embodiments of the disclosure is illustrated.

According to various embodiments of the disclosure, a method performed by a near-RT RIC may include a process of receiving an RIC indication message from an E2 node, and the RIC indication message may include UE-related information, the UE-related information may include information indicating a radio resource control (RRC) state of a UE, and the RRC state may be one of a plurality of states including an RRC-connected state, an RRC-inactive state, and an RRC-idle state.

According to an embodiment, the RIC indication message may include information indicating the UE related to the RRC state.

According to an embodiment, the RIC indication message may include information indicating an RRC state of each UE in a list of one or more UEs.

According to an embodiment, the method may further include a process of transmitting an RIC subscription request message to the E2 node, and a process of receiving an RIC subscription response message from the E2 node after transmitting the RIC subscription request message, and the RIC subscription request message may include an event generation condition related to the RIC indication message.

According to an embodiment, the E2 node may be one of a gNB, a DU, an eNB, a gNB-CU, an en-gNB, and an ng-eNB.

According to embodiments of the disclosure, a method performed by an E2 node includes a process of transmitting an RIC indication message to a near-RT RIC, and the RIC indication message may include UE-related information, the UE-related information may include information indicating an RRC state of a UE, and the RRC state may be one of a plurality of states including an RRC-connected state, an RRC-inactive state, and an RRC-idle state.

According to an embodiment, the RIC indication message may include information indicating the UE related to the RRC state.

According to an embodiment, the RIC indication message may include information indicating an RRC state of each UE in a list of one or more UEs.

According to an embodiment, the method may further include a process of receiving RIC subscription request message from the E2 node and a process of transmitting an RIC subscription response message to the E2 node after receiving the RIC subscription request message, and the RIC subscription request message may include an event generation condition related to the RIC indication message.

According to an embodiment, the E2 node may be one of a gNB, a DU, an eNB, a gNB-CU, an en-gNB, and an ng-eNB.

According to embodiments of the disclosure, an apparatus of a near-RT RIC may include at least one transceiver and at least one processor, and the at least one processor may be configured to receive an RIC indication message from an E2 node, the RIC indication message may include UE-related information, the UE-related information may include information indicating an RRC state of a UE, and the RRC state may be one of a plurality of states including an RRC-connected state, an RRC-inactive state, and an RRC-idle state.

According to embodiments of the disclosure, an apparatus of an E2 node may include at least one transceiver and at least one processor, and the at least one processor may be configured to transmit an RIC indication message to a near-RT RIC, the RIC indication message may include UE-related information, the UE-related information may include information indicating an RRC state of a UE, and the RRC state may be one of a plurality of states including an RRC-connected state, an RRC-inactive state, and an RRC-idle state.

Figure 10:
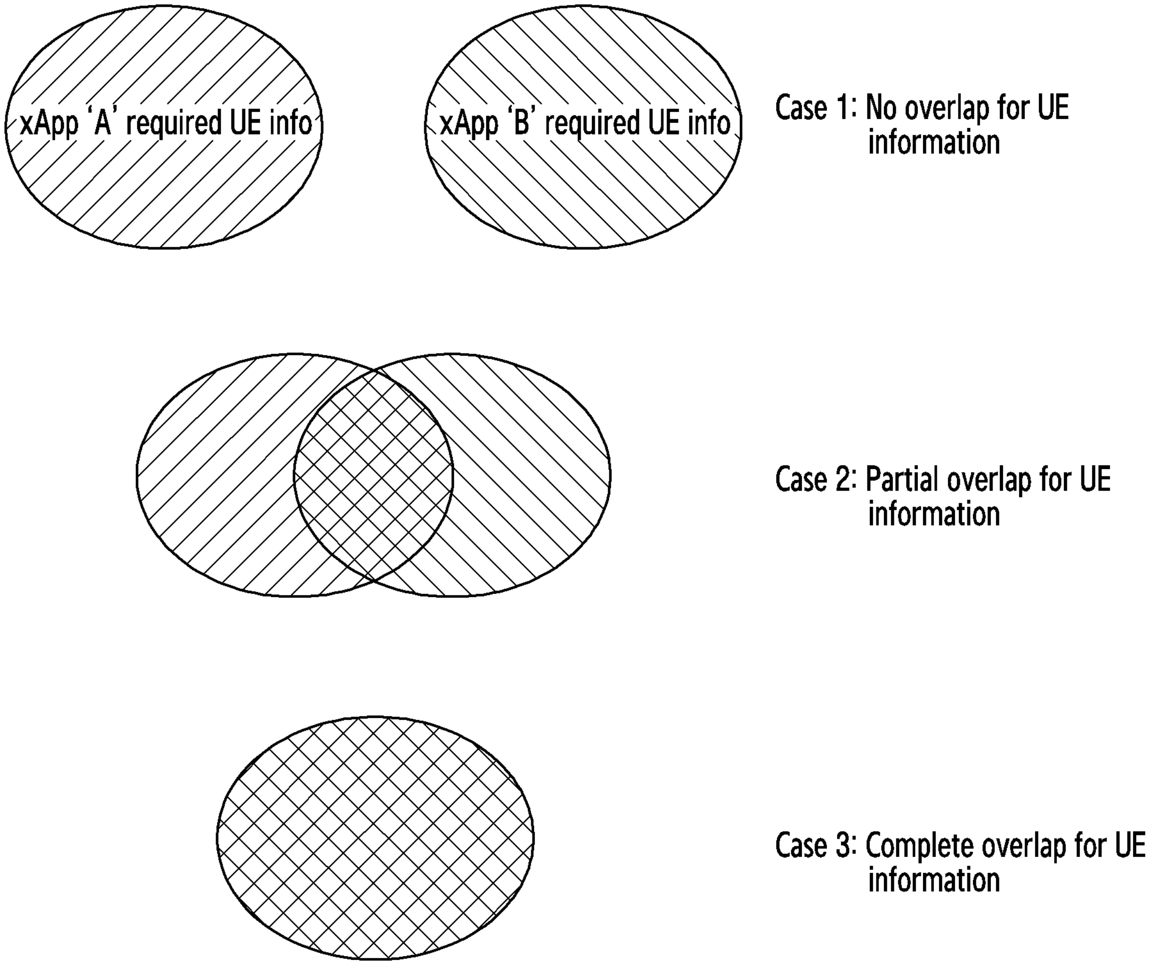
FIG. 10 illustrates an example of relations of UE information for each xApp according to an embodiment of the disclosure.

FIG. 10 illustrates an example of relations of UE information for each xApp according to an embodiment of the disclosure.

Referring to FIG. 10, an example displaying UE minimum information for each xAPP according to the disclosure is illustrated. xApps executed in the RIC may have the same or different pieces of required UE state information according to the type and function thereof. For example, a security-related xApp (xApp 1) and a QoS-related xApp (xApp 2) may have different pieces of UE state information. The example is shown in Case 1. In another example, in the case of QoS and traffic steering, required UE information may partially overlap. The example is shown in Case 2. According to circumstances, in the case of QoS and traffic steering, required UE information may be completely the same. The example is shown in Case 3.

Figure 11:
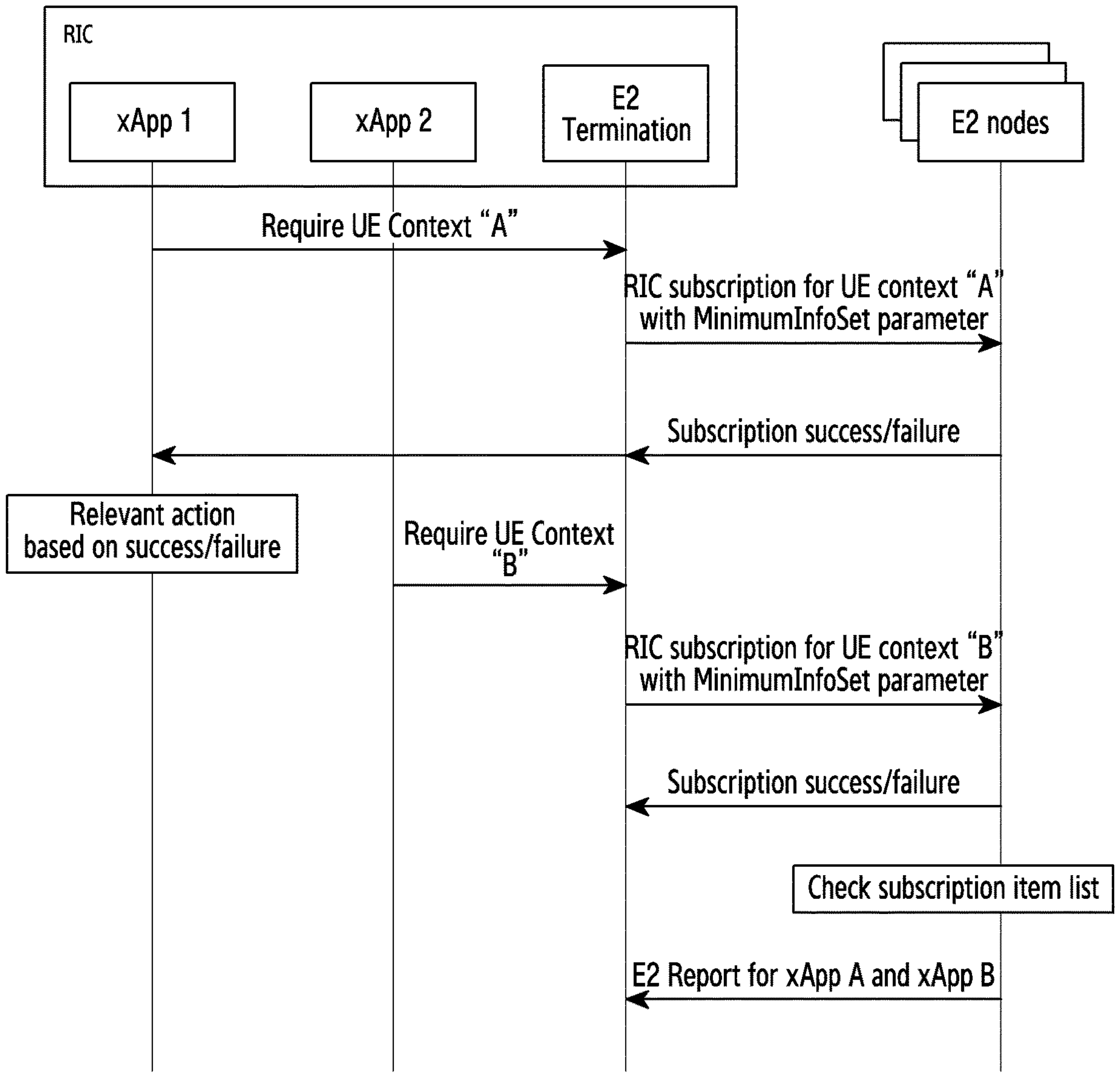
FIG. 11 illustrates signaling between the E2 node and the RIC based on a UE context request for each xApp according to an embodiment of the disclosure.

FIG. 11 illustrates signaling between the E2 node and the RIC based on a UE context request for each xApp according to an embodiment of the disclosure.

Referring to FIG. 11, a subscription procedure in which xApp 1 and xApp 2 share UE context (or cell context information) with the RIC and report procedure signaling according thereto are illustrated according to various embodiments of the disclosure. According to an embodiment, the E2 node may be an O-CU or an O-DU. The subscription procedures in FIG. 8 may be used in the same or similar way. Although a SET UP procedure, an RIC subscription procedure, an RIC indication message transmission procedure, and an RIC control message transmission procedure (not shown) are sequentially illustrated, various embodiments of the disclosure are not limited to the above order or procedures. That is, in some embodiments, the E2 node and the RIC may independently perform the E2 configuration procedure. In some embodiment, the E2 node and the RIC may independently perform the subscription procedure. Meanwhile, according to an embodiment, as described above, an E2 configuration response message may include a subscription request message.

When xApp 1 makes a request for a UE context information list A by procedure, the RIC may transmit an RIC subscription message including UE minimum information (MinimumInfoSet parameter) for xApp 1 to the E2 node through the E2 termination. When a moderator function of the RIC supports a minimum information setting function of the UE, the RIC carries the MinimumInfoSet parameter on the RIC subscription message to transmit the same. Thereafter, when xApp 2 makes a request for a UE context information list B to the same UE, the RIC may transmit an RIC subscription message including UE minimum information (MinimumInfoSet parameter) for xApp 2 to the E2 node through the E2 termination. When a moderator function of the RIC supports a minimum information setting function of the UE, the RIC carries the MinimumInfoSet parameter on the RIC subscription message to transmit the same. The E2 node may compare the subscription request messages of xApp 1 and xApp 2 and transmit the compared result to the RIC.

In some embodiments, when the two pieces of UE minimum information are the same, the E2 node may transmit an E2 report to the RIC according to one cycle. The E2 node may transfer one E2 report to two target xApps through the RIC according to the fastest report cycle in two subscriptions. For example, when the report cycle of xApp 1 is 4 ms and the report cycle of xApp 2 is 16 ms, the E2 node may transmit the E2 report to the RIC according to the report cycle of xApp 1. The RIC may store the received information in the DB. Thereafter, a subscription manager may transfer information required for the corresponding xApp to the xApp from the DB. At this time, a preset report cycle may be used as the cycle (for example, xApp 1 being 4 ms and xApp 2 being 16 ms).

In other embodiments, when the two pieces of UE minimum information are partially the same, the E2 node may transmit the E2 report to the RIC according to one cycle. According to an embodiment, the E2 node may compare the subscription request messages of xApp 1 and xApp 2 and when overlapping information is much (for example, IEs larger than the predetermined number), the E2 node may add the UE information and transmit one E2 report to the RIC according to the fastest report cycle in the subscription. The RIC may transmit the received information to two target xApps. That is, the E2 node may configure the E2 report by a union of each minimum information and transmit the E2 report. Specifically, the RIC may store the received information in the DB. Thereafter, a subscription manager may transfer, from DB to the xApp, information required for the corresponding xApp. According to another embodiment, the E2 node may transmit overlapping information according to the E2 report of a short cycle, and the E2 report of a long cycle may be transmitted without overlapping information. For example, when the cycle of the xApp A is 2 ms and the cycle of xApp 2 is 6 ms, the E2 node may transmit the complete UE report for the xApp A according to the cycle of 2 ms and transmit the UE report for xApp 2 according to the cycle of 6 ms without overlapping information. A reference cycle determination scheme for each of different xApps or an operation for a scheme (information or cycle) to transmit the E2 report can be determined according to a configuration.

In other embodiments, when the two pieces of UE minimum information partially overlap or do not overlap, the E2 node may transmit the E2 report to the RCI according to one cycle. An excessively long cycle has difficulty in providing an accurate service, and thus the E2 node may determine the shortest cycle as a reference cycle among the cycles for respective xApps. The E2 node may transmit an E2 report according to the reference cycle. The E2 node may generate one E2 report based on a union of cycle information for each xApp. The E2 node may transmit one E2 report to the RIC. The RIC may also store the received information in the DB. Thereafter, a subscription manager may transfer, from DB to the xApp, information required for the corresponding xApp.

FIG. 12 illustrates an example of UE information according to an embodiment of the disclosure.

Referring to FIG. 12, an example of a message format of a subscription procedure in which xApp 1 and xApp 2 share UE context or cell context information with the RIC is illustrated according to various embodiments of the disclosure. A subscription request message specified in the O-RAN standard lists sequence of actions, and one thereof is RIC action definition. The RIC action definition may be different for each E2 service model, and each thereof may be defined. The RIC action definition can be additionally defined in detail according to a style, and the detailed definition can be made through RAN parameters.

Referring to FIG. 12, the subscription request message may include sequence of action. In the 'sequence of action' IE, MinimumInfoSet is defined through an RAN parameter ID of one RIC action definition. The MinimumInfoSet serves to inform the E2 node that UE information can be shared with another subscription in an initial subscription step by the RIC. The information of FIG. 9 and Scell information as well as the MinimumInfoSet may be additionally included in the corresponding format.

FIG. 13 illustrates an example of UE information according to an embodiment of the disclosure.

Referring to FIG. 13, when sharing of UE context or cell context information with the RIC is displayed by xApp 1 and xApp 2 in a subscription procedure, an E2 indication header format through which the E2 node informs the RIC that E2 reports messages are integratively transmitted is illustrated. The RIC indication message specified in the O-RAN standard includes RIC indication header information. The RIC indication message may be different for each E2 service model, and each thereof may be defined. The RIC indication header is a detailed message in a service model and may define an E2SM indication header format. As details therefor, an RAN parameter ID of RIC action definition can be defined. MinimumInfoSet of FIG. 13 may indicate that, when the E2 node transmits UE information to the RIC through the RIC indication message, the corresponding information is information shared between several xApps and has been transmitted on the basis of a minimum cycle. The information of FIG. 9 and Scell information as well as the MinimumInfoSet may be additionally considered for the corresponding format.

FIG. 14 illustrates signaling between the E2 node and the RIC based on a UE context request for each xApp according to an embodiment of the disclosure.

Referring to FIG. 14, an example of a subscription procedure in which xApp 1 and xApp 2 share UE context or cell context information with the RIC is illustrated according to various embodiments of the disclosure. The E2 node may acquire UE state information of xApp 1 through a subscription request message. The E2 node may acquire UE state information of xApp 2 through a subscription request message. The E2 node may generate an E2 report according to a union since there is difference between UE state information of xApp 1 (UE minimum information) and UE state information of xApp 2 (UE minimum information). The E2 node may transmit the E2 report according to an available minimum reporting cycle among the reporting cycles of xApp 1 and xApp 2.

In the above-described embodiments, the respective IDs described for UE minimum information may include IEs in Table 1. According to an embodiment, at least one of the IEs may be configured for transmission of UE state information and a specific xApp per UE or per cell.

TABLE 1

| IE/Group Name | Presence | Range | IE type and reference | Semantics description |
|---|---|---|---|---|
| RAT type | M | | | |
| O-RAN UE ID | O | | | |
| RAN UE Group ID | O | | | |
| Bearer State | O | | | ROHC state |
| QOS flow to DRB mapping rules | O | | | |
| C-RNTI for Source PCell | O | | | |
| Source PCell Cell identity | O | | | |
| Source PCell Physical Cell identity | O | | | |
| Source SCell List | O | | | |
| > SCell Cell Identity | O | | | |
| > SCell Physical Cell Identity | O | | | |
| Radio Bearer Configuration | O | | | |

TABLE 1-continued

| IE/Group Name | Presence | Range | IE type and reference | Semantics description |
|---|---|---|---|---|
| > The list of SRBs | O | | | SRB1, SRB2, SRB3 |
| > The list of DRBs | O | | | |
| RRC State Information | O | | | Idle, Active, Inactive |
| Full I-RNTI | O | | | |
| Short I-RNTI | O | | | |

An example using the control message is described below. The RIC may control UE scheduling through the control message.

According to an embodiment, the RIC may configure the control message in order to control throughput of the UE. For example, in order to first determine throughput of a weak electric field UE, the RIC may store a scheduling priority at an appropriate level and configure the control message to allocate the larger number of physical radio resource blocks to the corresponding UE. To this end, the RIC may induce the corresponding UE to acquire higher throughput.

According to an embodiment, when a channel quality of the UE is low (for example, when a packet error rate is high), the number of retransmissions increases, the RIC may configure the control message to configure a target BLER to be lower. Through the control message, it is possible to allocate resources through a lower MCS by indicating a lower target BLER. The RIC may induce reduction of an error rate through the control message. This is because, when a low target BELR is transmitted, an MCS of resources allocated to the RU actually through the DU becomes lower.

According to an embodiment, the RIC may configure scheduling parameters according to a service provided to the UE. For example, scheduling parameters within the control message may be configured to reduce an amount of interference which the UE receives by another UE by limiting the maximum allocable radio resource block size per UE or guaranteeing the radio resource block size equal to or larger than at least a certain size or to guarantee a service level equal to or higher than a reasonable level by preventing the lack of allocated resources.

A method by which the RIC directly calculates and transmits the size of maximum allocable/guaranteed radio resource blocks is possible, but a method by which the RIC transmits a guaranteed data rate to a scheduler within the DU and the scheduler directly controls the required radio resource block size is also possible. According to an embodiment, the RIC may transmit the control message including a guaranteed data rate to a scheduler within the DU. The operation can be applied when the RIC is required for a DRB served at a non-guaranteed bit rate. When the service should be performed over a plurality of cells, the control message including the guaranteed data rate may be useful, when scheduling, for the RIC in consideration of an air situation and a data distribution situation experienced per cell by the UE. The RIC may transfer information for guiding the DU to distribute throughput in units of appropriate guaranteed data rate units for each cell. In cell unit (or DRB unit) scheduling, the guide may be useful.

The IPC cost may be reduced by the control of RRM of the RIC according to various embodiments of the disclosure. Particularly, when the DU/CU/RIC are located in the same environment, the cost for message relay may be reduced. The RIC performs all processes except for message transmission, thereby solving a reciprocity problem according to the operation between vendors. Further, an intelligent function of the RIC may be upgraded to replace a specific function between the DU and the CU-UP.

The E2 control message may be individually defined on the basis of an RAN function which can be supported for each E2 node through the use of conventional E2SM-KPM, but the restrictions in implementation described in FIGS. 10 and 11 may be generated when the multi-vendor is supported. Meanwhile, the RIC according to various embodiments of the disclosure may control all of the O-CU-CP, the O-CU-UP, and the O-DU by using an RRC E2 control message relaying the control message through the conventional E2SM NI and E2SM-KPM. As the overall control becomes possible by the RIC, efficient management can be performed. Particularly, effective load distribution can be achieved in a service area in which vendors overlap.

In the disclosure, an operation mode is named a "zombie mode" to describe the operation of the E2 node and operations of each entity are described according to the control of RRM of the RIC, but embodiments of the disclosure are not limited thereto. In addition to the zombie mode, other names may be used in embodiments of the disclosure as a mode replacing the functions of the CU or the DU.

The methods according to the embodiments described in the claims or the specification of the disclosure may be implemented in software, hardware, or a combination of hardware and software.

As for the software, a non-transitory computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a near-real time (RT) radio access network (RAN) intelligent controller (RIC) in a mobile communication system, the method comprising:

receiving, from an E2 node, an RIC indication message, wherein the RIC indication message includes user equipment (UE)-related information on a per UE basis, wherein the UE-related information includes a list of UEs, and information indicating a current radio resource control (RRC) state of each UE in the list, wherein the information indicating the current RRC state comprises an information element having a value corresponding to a RRC state, and wherein the RRC state is one of a plurality of states including an RRC-connected state, an RRC-inactive state, and an RRC-idle state.

2. The method of claim 1, further comprising:

transmitting an RIC subscription request message to the E2 node; and receiving an RIC subscription response message from the E2 node after transmitting the RIC subscription request message, wherein the RIC subscription request message includes an event generation condition related to the RIC indication message.

3. The method of claim 1, wherein the E2 node is one of a next generation node B (gNB), a distributed unit (DU), an evolved node B (eNB), a gNB-central unit (CU), an en-gNB, or an ng-eNB.

4. A method performed by an E2 node in a mobile communication system, the method comprising:

transmitting, to a near-real time (RT) radio access network (RAN) intelligent controller (RIC), an RIC indication message, wherein the RIC indication message includes user equipment (UE)-related information on a per UE basis, wherein the UE-related information includes a list of UEs, and information indicating a current radio resource control (RRC) state of each UE in the list, wherein the information indicating the current RRC state comprises an information element having a value corresponding to a RRC state, and wherein the RRC state is one of a plurality of states including an RRC-connected state, an RRC-inactive state, and an RRC-idle state.

5. The method of claim 4, further comprising:

receiving an RIC subscription request message from the near-RT RIC; and transmitting an RIC subscription response message to the near-RT RIC after receiving the RIC subscription request message, wherein the RIC subscription request message includes an event generation condition related to the RIC indication message.

6. The method of claim 4, wherein the E2 node is one of a next generation node B (gNB), a distributed unit (DU), an evolved node B (eNB), a gNB-central unit (CU), an en-gNB, or an ng-eNB.

7. A near-real time (RT) radio access network (RAN) intelligent controller (RIC) in a mobile communication system, the near-RT RIC comprising:

a transceiver; and a processor coupled with the transceiver, wherein the processor is configured to receive, from an E2 node, an RIC indication message, wherein the RIC indication message includes user equipment (UE)-related information on a per UE basis, wherein the UE-related information includes a list of UEs, and information indicating a current radio resource control (RRC) state of each UE in the list, wherein the information indicating the current RRC state comprises an information element having a value corresponding to a RRC state, and wherein the RRC state is one of a plurality of states including an RRC-connected state, an RRC-inactive state, and an RRC-idle state.

8. The near-RT RIC of claim 7, wherein the processor is further configured to:

transmit an RIC subscription request message to the E2 node, and receive an RIC subscription response message from the E2 node after transmitting the RIC subscription request message, wherein the RIC subscription request message includes an event generation condition related to the RIC indication message.

9. The near-RT RIC of claim 7, wherein the E2 node is one of a next generation node B (gNB), a distributed unit (DU), an evolved node B (eNB), a gNB-central unit (CU), an en-gNB, or an ng-eNB.

10. An E2 node in a mobile communication system, the E2 node comprising:

a transceiver; and a processor coupled with the transceiver, wherein the processor is configured to transmit, to a near-real time (RT) radio access network (RAN) intelligent controller (RIC), an RIC indication message, wherein the RIC indication message includes user equipment (UE)-related information on a per UE basis, wherein the UE-related information includes a list of UEs, and information indicating a current radio resource control (RRC) state of each UE in the list, wherein the information indicating the current RRC state comprises an information element having a value corresponding to a RRC state, and wherein the RRC state is one of a plurality of states including an RRC-connected state, an RRC-inactive state, and an RRC-idle state.

11. The E2 node of claim 10, wherein the processor is further configured to:

receive an RIC subscription request message from the near-RT RIC, and transmit an RIC subscription response message to the near-RT RIC after receiving the RIC subscription request message, wherein the RIC subscription request message includes an event generation condition related to the RIC indication message.

12. The E2 node of claim 10, wherein the E2 node is one of a next generation node B (gNB), a distributed unit (DU), an evolved node B (eNB), a gNB-central unit (CU), an en-gNB, or an ng-eNB.

* * * * *